Feb. 17, 1942.  G. SPATTA  2,273,336
AXLE HOUSING
Filed Aug. 8, 1940  2 Sheets-Sheet 1
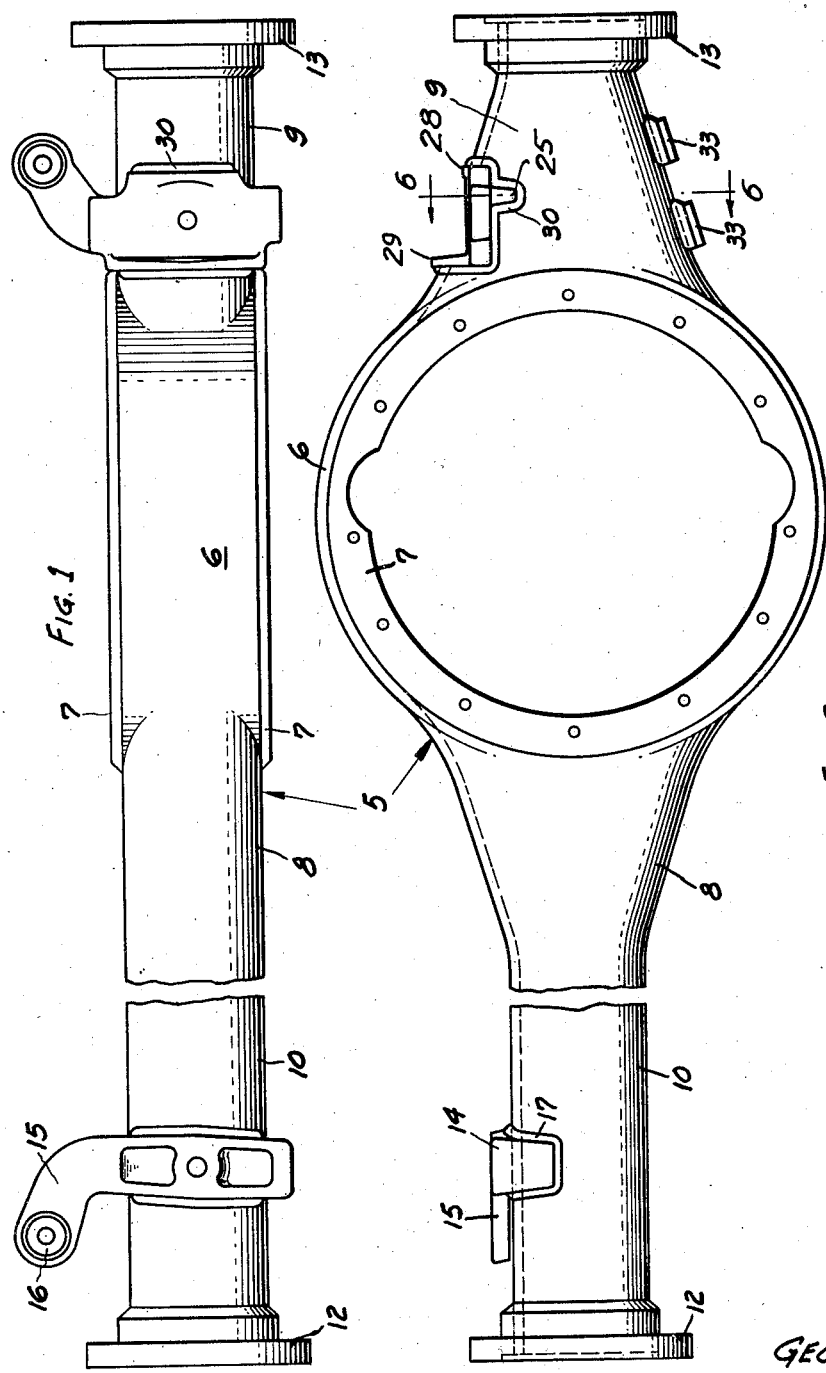
INVENTOR
GEORGE SPATTA.
BY Walter E. Schirmer
ATTORNEY Feb. 17, 1942.   G. SPATTA   2,273,336
AXLE HOUSING
Filed Aug. 8, 1940   2 Sheets-Sheet 2
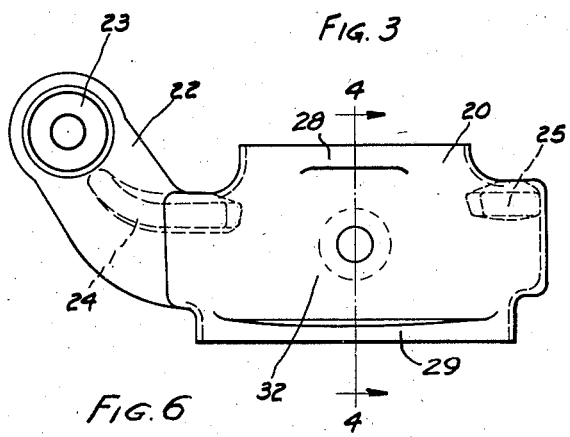
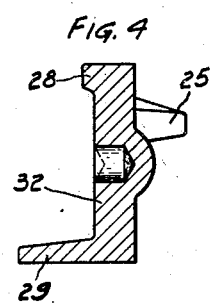
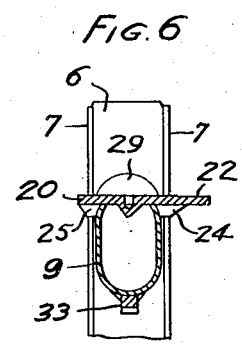
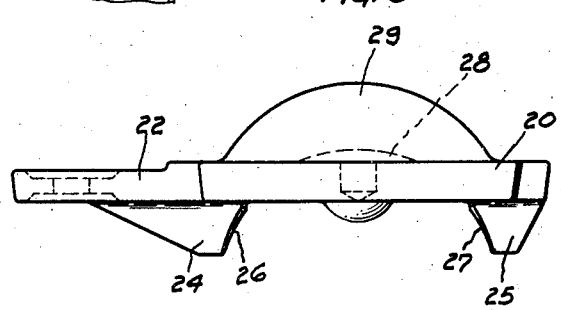
INVENTOR
GEORGE SPATTA
BY Walter E. Schirmer
ATTORNEY Patented Feb. 17, 1942

2,273,336

UNITED STATES PATENT OFFICE 2,273,336

AXLE HOUSING

George Spatta, Buchanan, Mich., assignor to Clark Equipment Company, Buchanan, Mich., a corporation of Michigan Application August 8, 1940, Serial No. 351,841

11 Claims. (Cl. 301—124)

This invention relates to axle housings, and more particularly is directed to axle housings used in connection with trucks and other commercial vehicles in which the differential is mounted in a position offset from the longitudinal center plane of the truck.

In the previous constructions with which I am familiar it has been necessary to provide a two piece type of differential housing in drives of this type in order to reduce the extent of the differential housing so that spring pads could be applied in the proper positions relative the frame of the vehicle on portions of the housing away from the differential portion. This has, to a large degree, precluded the use of what is known as the "banjo" type axle housing, preferably, although not necessarily formed from a single tubular blank, and which has become the production type housing for a large number of truck manufacturers.

The banjo type housing is characterized by the provision of a transverse circular frame in which is mounted the differential carrier, this opening having its axis normal to the longitudinal extent of the housing. The housing then has oppositely extending tubular arms which are joined to the banjo portion by means of generally frusto-conical tapering throats, although these throat portions are flattened somewhat to merge into the planes of the banjo openings on opposite sides of the housing. Due to these tapering throat portions is has heretofore been thought unwise to provide such a housing where any appreciable amount of offset was required for the differential as no adequate means for supporting the spring pad was possible except on the tubular arm portions.

However, with the present invention I am able to provide a spring pad closely adjacent the circular banjo frame and in a position such as to conform to the requirements for offset differentials now in mode, especially in connection with drives of the four-wheel type in which the forward driving and steering axle must have the differential offset sufficiently to allow the drive shaft to clear the engine and transmission of the vehicle.

I accomplish this result by cutting a generally rectangular slot in the upper surface of the throat portion closely adjacent the point where the throat merges into the circular periphery of the banjo. This slot has two parallel defining edges at the ends thereof, and the sides of the slot are defined by the arcuate edges of the upper surface of the throat. The spring pad has a generally horizontal portion adapted to receive the spring, and is provided on opposite edges with upturned flange portions which are arcuate in outline to conform to the arcuate surface of the throat defining the side walls of the slot. As a result, the spring pad can be welded in place in the slot about the entire periphery of the slot, the pad being recessed into the slot in such manner as to resist entirely any shear or twisting stresses. However, in order to insure positive mounting of the spring on the pad, I preferably also provide lugs or the like welded or otherwise suitably secured to the under surface of the throat directly opposite the slot, these lugs engaging the spring clips to prevent the possibility of their sliding downwardly toward the small diameter end of the throat portion.

Other objects and advantages of the present invention will be more apparent from the following detailed description, which, taken in conjunction with the accompanying drawings, will disclose to those skilled in the art the particular construction and operation of a preferred form of the present invention.

In the drawings:

Figure 1 is a top plan view of an axle housing embodying the present invention;

Figure 2 is a side elevational view of the housing shown in Figure 1;

Figure 3 is a top plan view on a somewhat larger scale of the spring pad;

Figure 4 is a sectional view taken substantially on line 4—4 of Figure 3;

Figure 5 is a side elevational view of the pad shown in Figure 3; and

Figure 6 is a section taken on the line 6—6 of Figure 2.

Referring now in detail to the drawings, the housing 5 comprises a generally circular banjo portion 6 having inturned radial flanges to which are secured reinforcing rings 7. The flanges and rings are tapped to receive suitable mounting studs for securing a differential carrier in the opening formed in the banjo. The banjo 6 has the tapering throat portions 8 and 9 extending in opposite directions, the throat portion 8 merging into the tubular arm portion 10 which, at its outer end, is flanged as indicated at 12 for receiving a wheel bearing or a connection to a wheel spindle or the like. The throat portion 9 which is on the short side of the housing terminates directly in a flange member 13 secured thereto by welding or the like. It will therefore be apparent that the center of the banjo opening is offset an appreciable distance from the longitudinal center of the housing.

The tubular arm portion 10 is provided with a spring pad 14 which may be of conventional design, but in the present embodiment of the invention, is provided with the offset extension 15 adapted to receive a torque arm or the like secured therein at the journal portion 16. The pad 14 is of arcuate shape on its lower surface, and fits about the tubular arm 10 and is welded thereto as indicated at 17. It will be apparent that this spring pad is located an appreciable distance from the banjo, and no question of clearances is present. Between the spring pad 14 and the banjo 6 the housing must be kept relatively small in order to provide proper clearance space beneath the engine of the vehicle, which extends between the spring pad 14 and the throat 8. Due to this location of the engine causing the banjo to be offset from the longitudinal center of the housing, it is essential that the opposite spring pad be disposed as closely to the banjo as possible in order to provide the same required distance between the pad and the flange member 13, as is provided between the pad 14 and the flange member 12.

To accomplish this result, I provide for cutting out an arcuate piece of metal from the upper surface of the banjo throat 9, this in turn providing a transverse slot across the upper surface of the throat. The slot is then adapted to receive the spring pad 20, shown more in detail in Figures 3, 4 and 5. The spring 20 may be a casting or forging, and is provided with the angularly offset portion 22 terminating in the journal portion 23 corresponding to the spring pad 14. The pad 20 is also provided with lugs 24 and 25 on its under surface, these lugs depending downwardly and being formed in such manner as to overlie the surface of the throat portion 9 at opposite ends of the slot. The lugs are shown in detail in Figure 5, and it will be noted have arcuate surfaces 26 and 27 conforming to the curvature of the throat portion 9.

The opposite sides of the body portion of the lug 20 are provided with vertically extending flanges 28 and 29. The flange 28 is of relatively small extent, and is provided with an external arcuate periphery conforming to the arcuate curvature of the adjoining defining edge of the throat. The flange 29 is of appreciably greater extent due to the taper of the throat, and also is adapted to fit against and close off the arcuate defining edge of the throat. When the pad has been placed in position, it is welded about its periphery to the external surface of the housing about the slot in the throat 9, as indicated at 30 in Figures 1 and 2. The welding of the pad in position insures entire closing of the slot, and also disposes the pad within the recess in such manner as to restrain it against any twisting stresses in a horizontal plane. Preferably, the spring is held onto the intermediate surface 32 of the pad by means of U-shaped spring clips which embrace the throat 9 at their base and having their extending ends thereof passing beyond the spring pad to engage a suitable bracket carried by the spring. In order to prevent the clips from sliding outwardly along the tapered surface of the throat 9, I preferably weld two arcuate lugs 33 in the position shown in Figure 2. The clips engage against the banjo side of each of these lugs, and consequently are securely held against movement relative to the throat 9.

It will therefore be apparent that I have provided a novel type of axle housing construction which eliminates all the difficulties of alinement and assembly necessary in the two-piece type of differential housing, which takes advantage of the production manufacture of banjo type housings and at the same time facilitates the mounting of the springs thereon without requiring any chassis alterations or expensive equipment.

I therefore do not intend to have the invention limited except as defined by the scope and spirit of the appended claims.

I claim:

1. An axle housing comprising a banjo frame portion and oppositely extending tubular arms joined thereto by tapering throat portions, said arms being of unequal length, a transverse slot cut in the upper surface of the throat portion leading toward the shorter arm, and a spring pad seated in said slot and welded to the peripheral defining edge thereof.

2. An axle housing having a banjo frame portion provided with opposed tapering throats, a generally rectangularly shaped opening formed transversely in the top of one of said throats, and a spring pad member shaped to fit in said opening and having arcuate side flange portions welded to the defining sides of said opening.

3. In an axle housing of the banjo type having tapering throat portions, a spring pad comprising a horizontally extending rectangular body portion, a pair of upturned flanges having arcuate peripheries corresponding to the curvature of said throat portions, and a pair of depending arcuate lugs adapted to engage opposed side portions of said throat when said pad is mounted in position.

4. In a banjo type axle housing having oppositely extending tapering throats, a transverse opening in the upper surface of one of said throats defined on its sides by the arcuate surfaces of said throat, a spring pad having a rectangular body portion fitting in said opening and having upturned side flanges mating with the arcuate side defining surfaces of said throat, and depending lugs on said pad engaging the lateral surface of the throat below said opening.

5. An axle housing of the banjo type having oppositely extending generally frusto-conical throat portions, a transverse slot in the upper surface of one of said throat portions adjacent the large end thereof, and a spring pad disposed in said slot and welded to the defining edges of the slot.

6. The housing of claim 5 further characterized in the provision of lug members welded to the under side of said throat portion beneath said pad for retaining spring clips on the conical surface of said throat in alinement with said pad.

7. A spring pad comprising a rectangular body portion having arcuate flanges rising from opposite sides thereof, and transversely spaced arcuate lugs extending downwardly from the under surface of said body portion.

8. The pad of claim 7 wherein said lugs are disposed in a plane intermediate said flanges.

9. The combination, in an axle housing having a banjo frame portion joined to extending tubular arms of different lengths by generally tapering throat portions, a first spring pad secured on the longer arm adjacent the other end thereof, and an aperture formed transversely across the throat portion adjacent the shorter arm, of a second spring pad welded in said aperture and having its upper supporting surface the same distance above the longitudinal axis of said housing as the supporting surface of said first pad.

10. The combination of claim 9 further characterized in the provision of lug members welded to the underside of said throat portion beneath said second pad for retaining spring clips on the tapering surface of said throat in alinement with said second pad.

11. An axle housing having a banjo frame portion intermediate its ends, oppositely tapering throat portions joined to said frame portion, a transversely extending slot across the upper surface of one of said throat portions, and a transverse spring pad disposed in and closing said slot and welded to the defining edges thereof.

GEORGE SPATTA.